(Model.)
E. P. WATERS.
HARNESS SADDLE TREE AND PAD.
No. 260,262. Patented June 27, 1882.
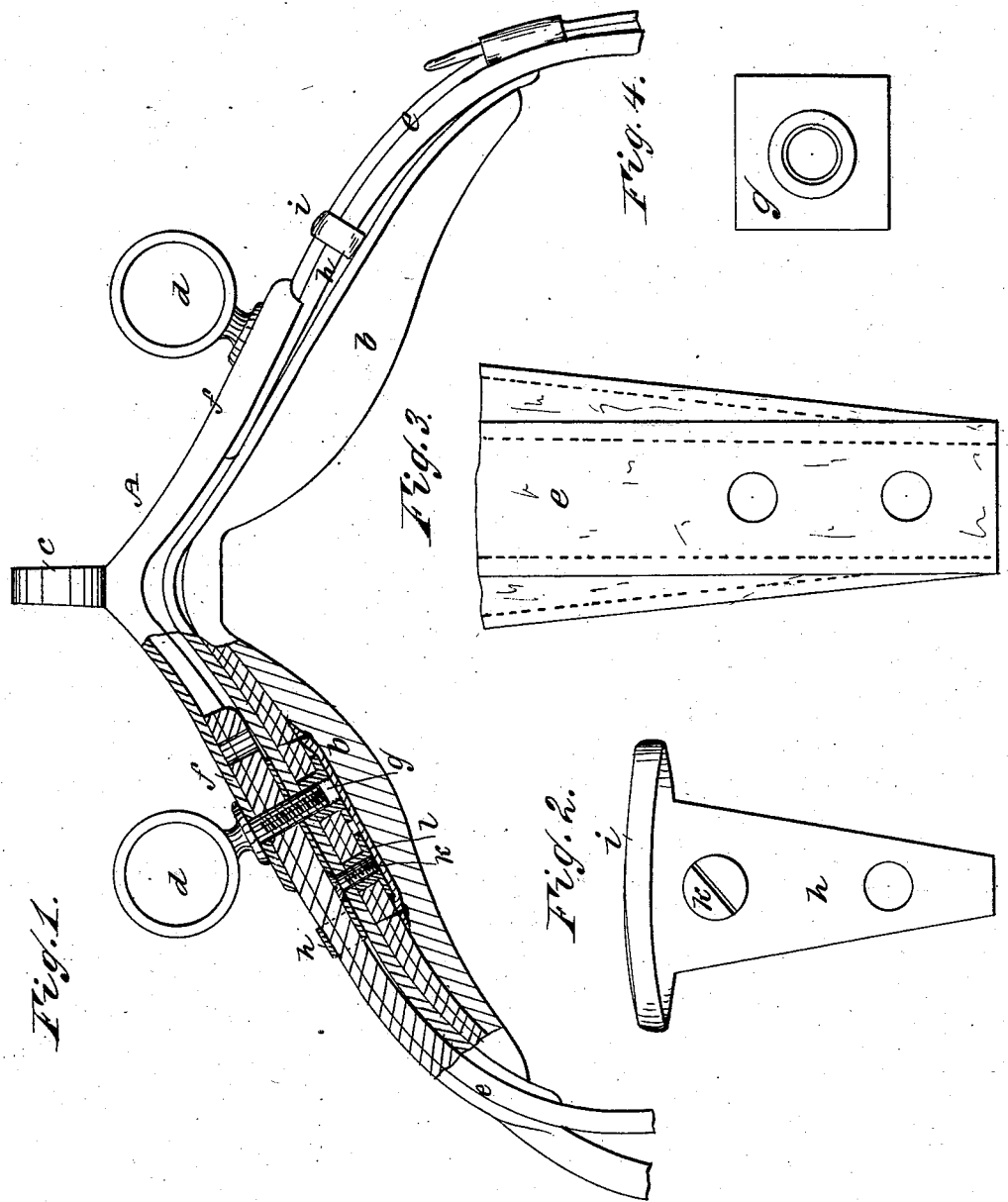
WITNESSES:
INVENTOR:
E. P. Waters
BY Munn & Co
ATTORNEYS.

UNITED STATES PATENT OFFICE.

EDWARD P. WATERS, OF ROSEVILLE, ILLINOIS.

HARNESS-SADDLE TREE AND PAD.

SPECIFICATION forming part of Letters Patent No. 260,262, dated June 27, 1882.

Application filed April 17, 1882. (Model.)

*To all whom it may concern:*

Be it known that I, EDWARD P. WATERS, of Roseville, in the county of Warren and State of Illinois, have invented a new and useful Improvement in Harness Trees and Pads, of which the following is a specification.

The object of this invention is to construct a harness tree and pad in such a manner as to secure quick and ready adjustment of the parts, whereby the skirts may be adjusted to any required length and secured firmly in place after adjustment.

To that end my invention consists in a harness-tree provided with pockets for receiving the ends of the skirts, they being held in place within the pockets by the terrets and by loops attached to the tree, as hereinafter described and claimed.

Reference is to be had to the accompanying drawings, forming a part of this specification, in which similar letters of reference indicate corresponding parts in all the figures.

Figure 1 is a front elevation, partly in section, of my improved harness tree and pad. Fig. 2 is a plan view of one of the holding-loops. Fig. 3 shows the end of one of the skirts. Fig. 4 is a face view of the nut for holding the terret.

A is the metal portion of the tree, provided with pads $b\ b$.

$c$ is the check-rein hook.

$d\ d$ are the terrets, and $e\ e$ are the skirts at each side. The iron A is formed at each side as a pocket, $f$, into which the upper end of the skirt $e$ enters. The terret $d$ passes through the pocket and the skirt, and is screwed at its lower end into a nut, $g$, that is attached within the pad $b$, so that the skirt is retained securely within the pocket.

$h$ is a metal piece, attached upon the upper side of pad $b$, and having its outer end formed with a loop, $i$, that is below the lower end of the pocket $f$. The skirt extends through this loop $i$, and the inner end of the piece $h$ extends into the pocket $f$, and is formed with an aperture that comes directly above the nut $g$, so that when the terret is inserted it passes through the skirt and through the piece $h$, thereby retaining these parts securely in place. The piece $h$ is also secured to the pad by the screw $k$, that takes into the nut $l$ beneath. The upper end of the skirt $e$ is formed with several apertures, through any one of which the terret may pass and the skirt thereby be lengthened or shortened, as required. The construction is the same at each side, the skirt being made in two pieces.

This tree and pad is of simple, inexpensive, and durable construction. It is lighter than those usually employed and less liable to breakage. There is no possibility of the parts becoming disconnected, and, having great flexibility, can be more readily adjusted to the horse's back.

If desired, the skirts may be connected as a continuous piece, and held upon the tree by the terrets in the same manner.

Having thus described my invention, I claim as new and desire to secure by Letters Patent—

1. The harness tree and pad consisting of the iron A, formed at its end with pockets $f$, the pads $b\ b$, and the adjustable skirts $e\ e$, combined together substantially as shown and described.

2. The combination of the skirts $e\ e$, having apertured ends, the tree A, formed with pockets $f$, the terrets $d$, and the nut $g$, substantially as described.

3. The combination of the nuts $g$ and terrets $d$ with the pockets $f$ and skirts $e$, substantially in the manner shown and described.

EDWARD P. WATERS.

Witnesses:
CHARLES A. ANDERSON,
WILLIAM B. CAMPBELL.